United States Patent
Kaufmann et al.

(10) Patent No.: US 8,897,145 B2
(45) Date of Patent: Nov. 25, 2014

(54) METHOD AND APPARATUS FOR NETWORK OAM INTERWORKING

(75) Inventors: William A. Kaufmann, Chicago, IL (US); Douglas J. Hawn, Melissa, TX (US); Chirayu A. Shah, Fremont, CA (US); Bruce M. Lasley, Dallas, TX (US); Ian P. Butler, Gaithersburg, MD (US); Jason T. Ledgerwood Jesseph, Norcross, GA (US)

(73) Assignee: Tellabs Operations, Inc., Naperville, IL (US)

( * ) Notice: Subject to any disclaimer, the term of this patent is extended or adjusted under 35 U.S.C. 154(b) by 789 days.

(21) Appl. No.: 12/887,901

(22) Filed: Sep. 22, 2010

(65) Prior Publication Data

US 2012/0069742 A1     Mar. 22, 2012

(51) Int. Cl.
*H04L 1/00* (2006.01)
*H04L 12/26* (2006.01)
*H04L 12/24* (2006.01)

(52) U.S. Cl.
CPC .......... *H04L 43/0811* (2013.01); *H04L 41/022* (2013.01)
USPC .......................... 370/242; 370/216; 370/241.1

(58) Field of Classification Search
USPC .................................................. 370/216, 242
See application file for complete search history.

(56) References Cited

U.S. PATENT DOCUMENTS

| | | | | |
|---|---|---|---|---|
| 2003/0112760 A1* | 6/2003 | Puppa et al. | ............... | 370/241.1 |
| 2005/0157750 A1* | 7/2005 | Rabie et al. | .................... | 370/466 |
| 2008/0144632 A1* | 6/2008 | Rabie et al. | ................ | 370/395.5 |
| 2008/0259959 A1* | 10/2008 | Zhai | ............... | 370/474 |
| 2008/0285466 A1* | 11/2008 | Salam et al. | ................ | 370/241.1 |
| 2009/0116396 A1* | 5/2009 | Regan et al. | ................... | 370/248 |
| 2010/0287405 A1* | 11/2010 | Soon | ................................ | 714/4 |

OTHER PUBLICATIONS

OAM functions and mechanisms for Ethernet based networks by ITU-I.*
OAM functions and meshanisms for Ethernet based networks by ITU-I.*
Author Unknown, "Integrated Services Digital Network (ISDN) Digital Subscriber Signalling System No. 1 (DSS 1)—Signalling Specifications for Frame Mode Switched and Permanent Virtual Connection Control and Status Monitoring," *International Telecommunication Union*, Q.933, Digital Subscriber Signalling System No. 1: pp. 3-45 (Oct. 1995).

(Continued)

*Primary Examiner* — Anh-Vu Ly
*Assistant Examiner* — Hashim Bhatti
(74) *Attorney, Agent, or Firm* — Hamilton, Brook, Smith & Reynolds, P.C.

(57) ABSTRACT

Network service providers have largely addressed the growth in demand for communications networks in two ways: employing faster and more robust communications protocols through equipment upgrades and increasing use of Operations, Administrations, and Management (OAM) procedures for improved network performance. Typically, OAM operations procedures used by a network protocol are unique to that protocol and are not compatible with other network protocols. Service providers with networks that use multiple communications protocols, such as networks using legacy and newly installed equipment, can have difficulty ensuring optimal performance due to non-compatible OAM operations. A method, and corresponding apparatus, for supporting OAM interworking between first and second communications protocols used in an interworking circuit of a communications network is disclosed. The method, or corresponding apparatus, allows network service providers to ensure optimal network performance in a manner that does not affect customer traffic, is transparent to customers, and can be seamlessly integrated into existing interworking network nodes.

10 Claims, 14 Drawing Sheets

(56) References Cited

OTHER PUBLICATIONS

Author Unknown, "Series Y: Global Information Infrastructure, Internet Protocol Aspects and Next-Generation Networks," *International Telecommunication Union*, Y.1731, OAM functions and mechanisms for Ethernet based networks, pp. 12-62 (Feb. 2008).

Shah, et al., "ARP Mediation for IP Interworking of Layer 2 VPN draft-ietf-l2vpn-arp-mediaiton-16.txt. (cited as "work in progress")," *Internet Engineering Task Force*, pp. 1-34: Memo dated: Mar. 4, 2011,(Expires Sep. 2011).

Author Unknown, "Virtual Bridged Local Area Networks," *IEEE Computer Society*, Amendment 5: Connectivity Fault Management, pp. 11-12, 21-23, 41 and 117-228 (Dec. 17, 2007).

\* cited by examiner

US 8,897,145 B2

METHOD AND APPARATUS FOR NETWORK OAM INTERWORKING

BACKGROUND OF THE INVENTION

To meet service demands of customers, service providers ensure performance of their communications networks, such as through the use of network operational activities, including fault detection, isolation, and notification. Network operational activities allow service providers to reroute traffic in an event of detection of a fault, thereby sustaining loss of traffic capacity along certain network routes and maintaining service demands of customers. To perform fault detection, isolation, and notification across disparate networks, service providers typically support a variety of service domains. Within a given service domain, network operational activities are monitored, and fault conditions are addressed, either through automated recovery procedures or manual recovery procedures. As a result of the network operational activities, service providers are generally able to demonstrate a robust network to their customers.

As demand for networks, such as the Internet, has grown, service providers have installed new equipment to existing networks. In order to support increased demand further, the newly added equipment often utilizes a faster and more robust communications protocols than legacy equipment. For continuity of service, it is useful that the newly added network equipment operate seamlessly with legacy equipment.

SUMMARY OF THE INVENTION

A method, and corresponding apparatus, for supporting Operation, Administration, and Maintenance (OAM) interworking between a first and a second communications protocol of an interworking circuit in a communications network is disclosed. The first and second communications protocols operate at a common communications layer of the communications network. Alternatively, the first and second communications protocols may operate at different layers. According to an example embodiment, the present invention may monitor the communications channels for state information and facilitate transparent awareness of the state of communications channels to support interworking between the first and second communications channels.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
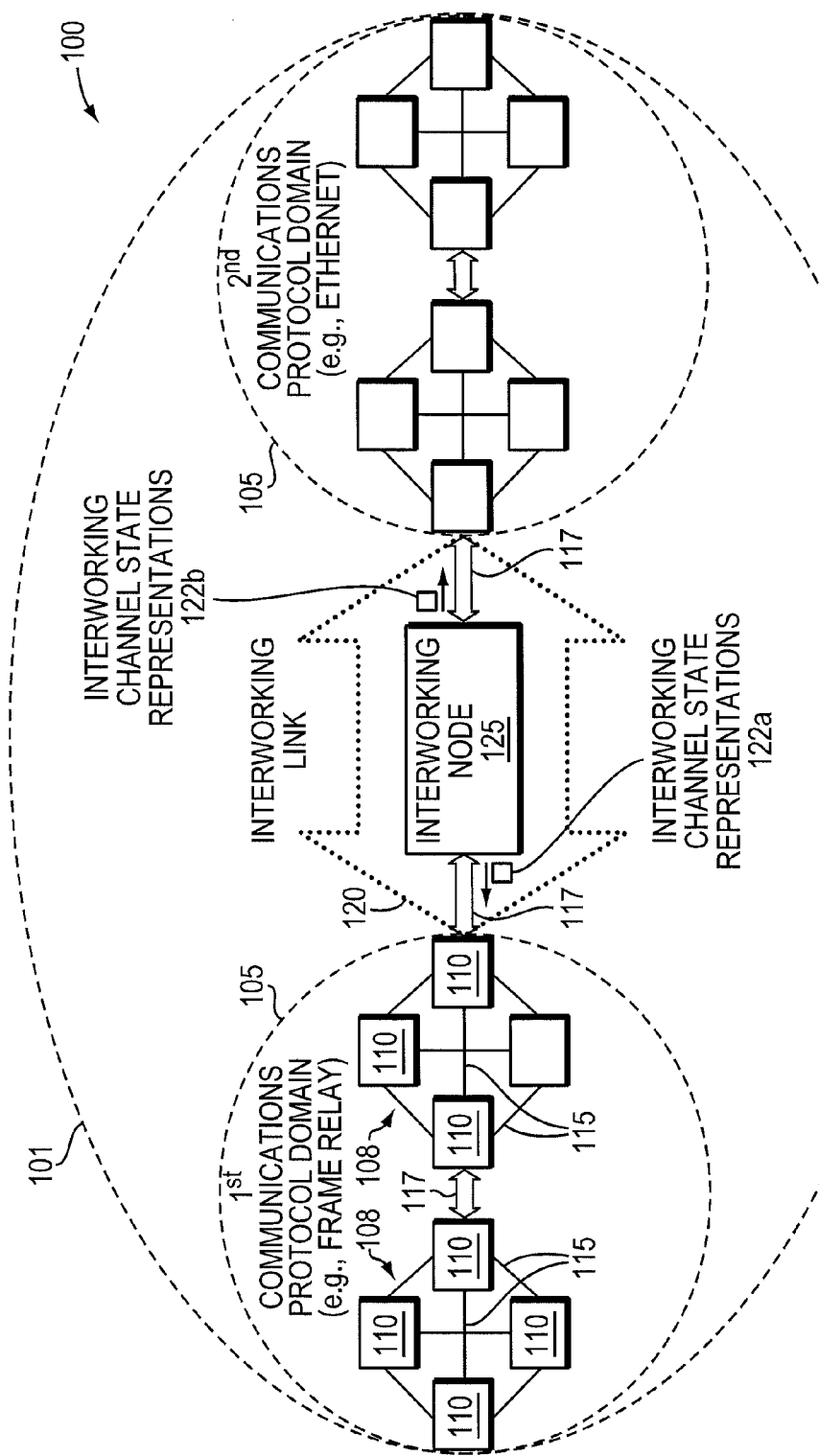
FIG. 1A is a network block diagram illustrating a communications network that uses two different communications protocols connected by an interworking link and is divided into multiple protocol domains.

A description of example embodiments of the invention follows.

An example embodiment of the invention relates generally to communications over a communications network and more particularly to methods and apparatus supporting the interworking of operations, administration and maintenance (OAM) functions between heterogeneous control plane technologies in the communications network.

Operations, Administration, and Maintenance (OAM) procedures can be used for monitoring networks by network operators. OAM refers to a set of functions that can be used to enable the detection of network faults, measurement of network performance, and distribution of fault-related information. Typically, OAM functions used by a particular network protocol are unique to that protocol and are not compatible with other (i.e., different) protocols. As a result, networks using multiple communications protocols, such as networks using both legacy equipment running corresponding legacy protocols and newly installed equipment using modern protocols, can have limited OAM capabilities. In many cases, the OAM limitations exist because the legacy OAM functions are not compatible with the newer OAM functions. This results in OAM functionality of each subsection of the network being constrained to the portion of the network using the respective associated protocol. With constrained OAM capability, network service providers are limited in their abilities to address network faults, reroute traffic, and meet customer demand. Thus, it is useful to support OAM interworking in networks, such as carrier access networks or carrier core networks, using multiple communications protocols, possibly in isolated maintenance domains configurations.

At least one embodiment of the present invention is configured to operate in a communications network employing legacy equipment using, for example, a Frame Relay protocol and modern equipment using, for example, an Ethernet protocol. Throughout the following description, reference is made to Frame Relay and Ethernet protocols, but it should be understood that such protocols represent convenient example communications protocols and that alternative embodiments may be configured to support interworking of different communications protocols, currently known or developed in the future, operating at the same or different network communications layers, such as at Layers 2, 2.5, or 3 of the International Organization for Standardization (OSI) stack. Service providers often use Frame Relay encapsulation for all low speed connections to the Public Internet or layer three (L3) virtual private network (VPN) services. Low speed connections currently refer to those connections with data transfer rates less than that of digital signal three (DS3). Today, these low speed circuits terminate on Frame Relay/Asynchronous Transfer Mode (FR/ATM) switches for T1 service and are then passed on to a Public Internet Protocol (IP) or L3 VPN Provider Edge (PE) router as ATM ports.

Unfortunately, this network model cannot handle the enormous network traffic growth forecast for the coming years, and Frame Relay/ATM switch vendors are discontinuing manufacture certain hardware and ending support or charging very high support fees. Also, cost to support ATM ports on provider edge (PE) routers in comparison to Gigabit Ethernet ports is high. Traditional ATM switches, like the FR-ATM switches, are creating more and more bottlenecks (as compared to newer communications protocol switches) that limit the extent to which service providers can expand their networks using legacy equipment. To meet the forecast demand, service providers are building scalable, multiservice, IP networks with capacity to expand. A potential solution to the ATM switch bottleneck is to eliminate the intermediate conversion from Frame Relay to ATM protocol at the FR-ATM switch and convert Frame Relay directly to the Ethernet protocol used on the PE routers. Modern PE routers may employ gigabit Ethernet (GigE) trunks that are more efficient and cost effective than legacy ATM ports.

A capability to convert FR protocol to Ethernet protocol, using pseudowire emulation (PWE), for handoff to GigE trunks, currently exists. However, with the existing PWE technology, service providers lose visibility of FR OAM signaling. This greatly reduces fault detection and response capabilities, and, in turn, greatly reduces an ability to reroute traffic and meet customer service expectations. Thus, an embodiment of the present inventions supports OAM interworking in carrier access networks using Frame Relay and Ethernet protocols, or, more generally, in networks across any two different communications protocols. In the case of FR and Ethernet protocols, in order to monitor customer services effectively and provide necessary outage notifications, remote-side FR channel states are recognized, translated, and communicated to the core-side PE router over an Ethernet trunk. Likewise, channel states on the core-side Ethernet trunk are passed back to affected FR circuits. Effective monitoring enables stable network communications OAM interworking.

An embodiment of the present invention includes a method, and corresponding apparatus, for supporting Operation, Administration, and Maintenance (OAM) interworking between a first and a second communications protocol of an interworking circuit in a communications network. The first and second communications protocols operate at a common communications layer of the communications network. Alternatively, the first and second communications protocols may operate at different layers. According to an example embodiment, the present invention may monitor the communications channels for state information and facilitate transparent awareness of the state of communications channels to support interworking between the first and second communications channels.

For purposes herein, transparent awareness means that the interworking circuit and interworking activities are effectively imperceptible to the communications protocols on either side of the interworking circuit at least with respect to the OAM interworking. For example, transparent awareness can mean that OAM signals or OAM signaling on one side of the interworking is received on the other side of the interworking without modification to either communications protocol, optionally from traffic or OAM perspective(s). Moreover, transparent awareness activities may include observation of traffic or OAM channels within the interworking circuit or received at the interworking circuit without disruption or modification to traffic or OAM signals or OAM signaling therein. Further, in at least one embodiment, the transparent awareness can also operate autonomously and automatically such that activation or continued operation signaling is not required. Still further, the transparent awareness can occur with respect to OAM signals or OAM signaling, in accordance with the focus of embodiments disclosed herein, or with respect to other signals or signaling, whether traffic or otherwise, in which transparent awareness across an interworking circuit is useful.

Some example embodiments of the present invention can be configured to support OAM interworking between Frame Relay and Ethernet communications protocols, for example, and a multiple logical interfaces or subinterfaces corresponding to the channels. This embodiment of the present invention may monitor Frame Relay continuity messaging on a per-interface, data-link connection identifier (DLCI) basis, translate that messaging to the corresponding Ethernet continuity messaging, and notify the corresponding Ethernet virtual local area network with an identifier. This embodiment may further or alternately monitor Ethernet continuity messaging in a similar manner, translate that messaging to the corresponding Frame Relay continuity messaging, and notify the corresponding Frame Relay virtual local area network with an identifier.

Some example embodiments of the of the present invention can use a method, or corresponding apparatus, of mapping the first and second channels and associated states to the corresponding second and first channels, respectively, and the respective associated states. The example embodiments that use this method, or corresponding apparatus, facilitate transparent awareness of the state of communications channels of an interworking circuit based on the mapping.

A number of example embodiments of the present invention may use a method, or corresponding apparatus, of accessing a table to map the first and second channels and associated states to the corresponding second and first channels, respectively, and the respective associated states. The accessed table can contain identifiers identifying the first and second communications channels and states for each protocol interface, or can include translation information corresponding to states for each protocol of the interworking circuit.

Various example embodiments of the present invention may use a method, or corresponding apparatus, to monitor the state of communications channels using an Operations, Administration, and Management (OAM) procedure. The OAM procedure may be used to confirm operation, detect or isolate faults or failures, or notify the network of faults or failures of the channels of the interworking circuit. The OAM procedure used in these example embodiments can include another procedure to verify connectivity, detect faults, monitor performance, or observe alarm indications.

Numerous example embodiments of the present invention can use a method, or corresponding apparatus, to monitor the state of the communications channels, including quality of service attributes of the interworking circuit, and to notify the first and second channels of the quality of service attributes of the second and first channels, respectively, to support the facilitating of transparent awareness. The monitored quality of service attributes that the corresponding channels are notified of can include availability, change in status, frame delay, frame delay variation, sequence error, bad frames, or frame loss.

Further example embodiments of the present invention may include a non-transitory computer readable medium containing instructions that can be executed by a processor, and, when executed, cause the processor to monitor a state of communications channels on a first and a second interface using a first and second communications protocol, respectively, and to facilitate transparent awareness of the state of the communications channels to support an interworking circuit of a communications network. The communications channels of the interworking circuit may be operating at a common communications layer of the communications network, with the first and second interfaces being associated with the first and second protocols, respectively.

Specific communications protocols, such as IEEE 802.1ag, used as examples herein are for illustration purposes only. Similarly, any specific signaling or nomenclature described in reference thereto should not be construed as limiting embodiments of the present invention. Other embodiments within the context of supporting OAM interworking between any two communications protocols may be employed.

FIG. 1A shows a block diagram illustrating an example of a communications network 100. The network is divided into maintenance domains (MD) 101, 105a, 105b for network management purposes. Typically, MDs are configured in a hierarchal relationship, where a higher level MD 100a can include multiple lower level MDs 105a, 105b. MDs are used by network providers to monitor the state of communications links within a MD by using, for example, a continuity messaging service.

Services are provided by a set of maintenance entities that are associated with service instances. This maintenance entity is shown as 108. Traffic communications service instance examples include virtual private label switching (VPLS) service, Ethernet point-to-point circuit, or circuit bundle.

Nodes 110, such as routers, at the edge of a maintenance domain are commonly contain a maintenance interface associate with each maintenance entity. A maintenance interface denotes the endpoints of a maintenance entity and resides on the boundaries of the MD within the network. Common protocol communications channels 115, such as label switched paths (LSPs), communicatively connect provider edge nodes 110 together and provide such service instance capabilities, such as VPLS. Maintenance entities can be tied together, through PE nodes 110, using circuit interface links 117. Subdivisions of the network running different communications protocols can be tied together using an interworking link 120. The interworking link supports the interworking of different communications protocols, and can include facilitating transparent awareness of the state of the communications channels using interworking channel state representations 122a, 122b. An interworking link 120 can employ different types of circuit interface links 117, which support the corresponding different types of communications protocols and an interworking node 125.

Figure 1B:
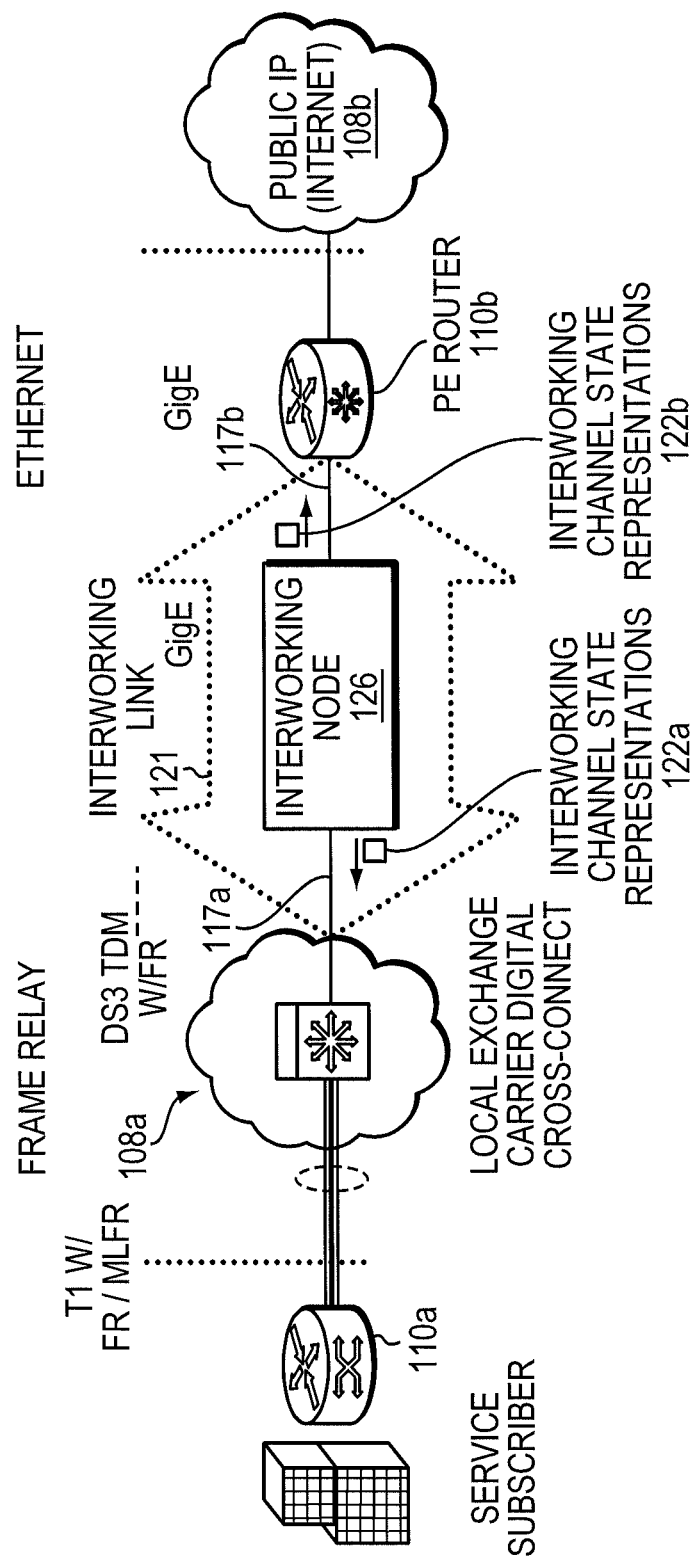
FIG. 1B is a network diagram illustrating a communications network that uses two different communications protocols connected by an interworking link.

FIG. 1B shows a diagram illustrating a particular example of a communications network that uses both Frame Relay and Ethernet protocols in which an embodiment of the present invention may be used. Frame Relay services are provided by a Frame Relay network 108a. Ethernet services are provided by an Ethernet network 108b. Frame Relay protocol is used on the remote side 117a to support low speed customer service.

In the example network of FIG. 1B, customers connect to the Frame Relay network 108a using Frame Relay equipment 110a. Frame Relay circuit interface links 117a are used to connect Frame Relay equipment 110a to create Frame Relay networks 108a. Ethernet PE routers 110b mark an edge of the Ethernet protocol network 108b within a core side 107b of the network. Similar to the Frame Relay domain of the network, Ethernet circuit interface links 117b are used to connect Ethernet PE routers 110b to create Ethernet protocol MAs 108b. An interworking link 121 provides connections between the two domains of the network using the different protocols. For example, one domain may use the Frame Relay protocol and another domain may use the Ethernet protocol. The interworking link 121 supports Frame Relay interworking channel state representations 122a. Examples of Frame Relay interworking channel state representations 122a may include local management connectivity messaging using a protocol such as local management interface (LMI). The interworking link 121 in this example network embodiment also supports Ethernet interworking channel state representations 122b. Many Ethernet channel state representations exist, where some examples of which are connectivity check messages (CCM) or other forms of monitoring connectivity states within, between, or among network nodes within a given maintenance domain. The interworking circuit link 121 may include a Frame Relay circuit interface link 117a and Ethernet circuit interface links 117b, along with an interworking node 126.

Figure 2:
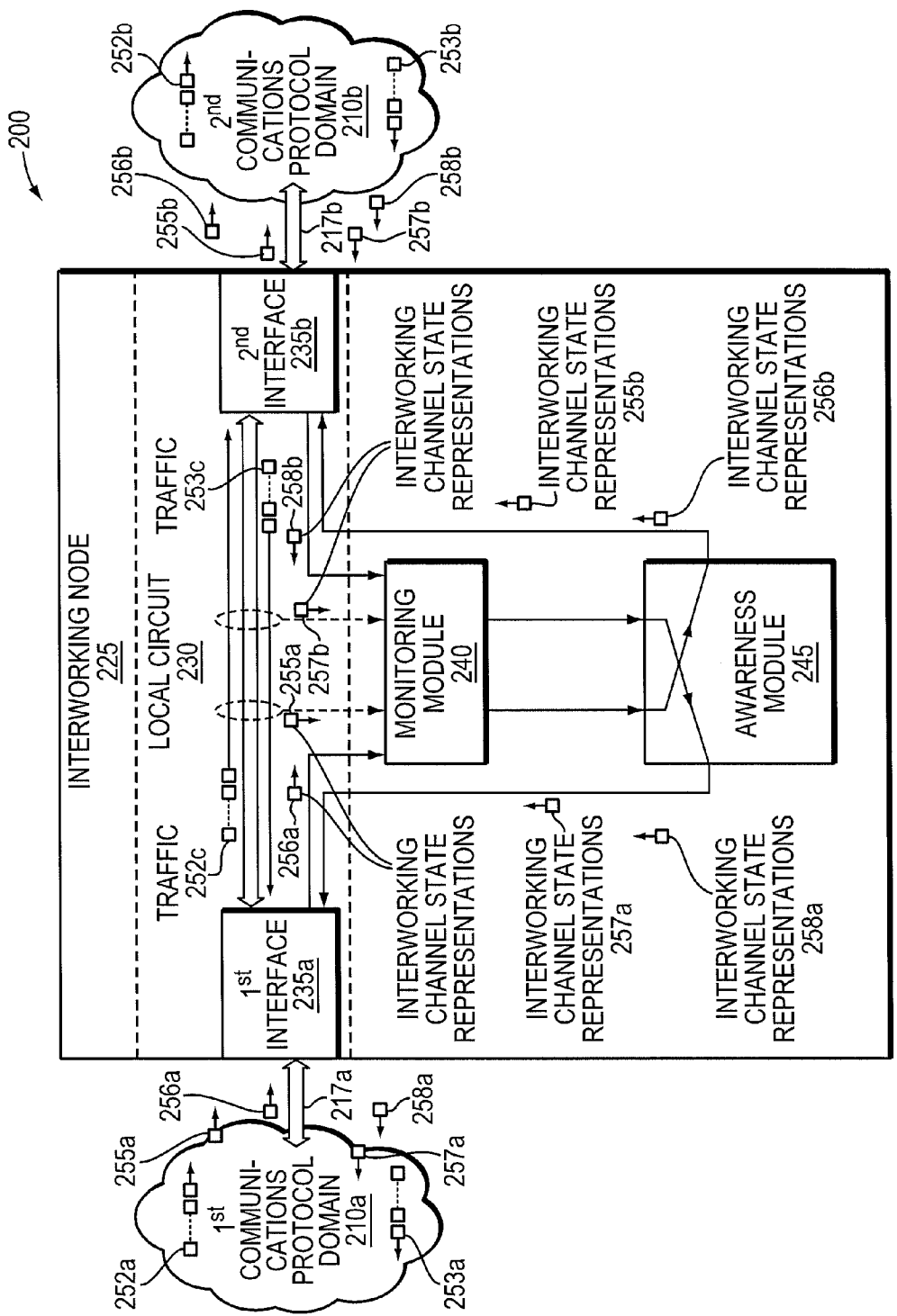
FIG. 2 is a block diagram illustrating an interworking node, within an interworking link, configured to monitor the state of communications channels and translate monitored state information from the first interface of the of the interworking node to the second interface and also from the second interface to the first interface.

FIG. 2 is a block diagram of an example of an interworking link 200 between first and second communications protocols. The interworking link 200 may monitor and facilitate transparent awareness of the state of communications channels between a first communications protocol domain 210a and a second communications protocol domain 210b. The interworking link 200 may include a first communications protocol circuit interface link 217a, second communications protocol circuit interface link 217b, and interworking node 225. The interworking node 225 may include a local interworking circuit 230, first interface 235a, second interface 235b, monitoring module 240, awareness module 245, and interworking pseudowire (PWE) 250.

In one embodiment, the interworking node 225 interfaces with the communications protocol of the first communications protocol domain 210a using an associated first interface 235a, and, likewise, the interworking node 225 interfaces with the communications protocol of the second communications protocol domain 210b using an associated second interface 235b. The first interface 235a establishes a connection with the first communications protocol domain 210a, while the second interface 235b establishes a connection with the second communications protocol domain 210b. The PWE 250 links the first and second interfaces 235a, b and forms the interworking node 225 section of an interworking circuit. It should be understood that the interfaces 235a, b can be physical or logical interfaces.

The channels of the interworking circuit are monitored by the monitoring module 240. In one embodiment, messaging from the first communications protocol domain 210a destined for the second communications protocol domain 210b, as well as messaging from the second communications protocol domain 210b destined for the first communications protocol domain 210a, is automatically monitored by the monitoring module 240. Select communications messages, such as interworking channel state representations, 255a, b, 256a, b, 257a, b, and 258a, b, are routed to the awareness module 245. Each select communications message, 255a, b, 256a, b, 257a, b, and 258a, b is routed to be automatically translated from the protocol of the domain from which it entered the interworking node 225 to the protocol of the domain to which is its destination to facilitate transparent awareness of the state of the communications channels of the interworking circuit. In this example embodiment, network traffic 252a, b and 253a, b not containing interworking channel state representations information would be automatically translated from the protocol of the domain from which it entered the interworking node 225 to the protocol of the domain to which it exited toward the traffic's destination, bypassing the monitoring module and the awareness module.

Traffic from the first communications protocol domain 210a destined for the second communications protocol domain 210b is represented by network traffic 252a, b, c. The interworking link may contain network traffic 252a, b, c at different stages of protocol translation. Multiple packets of communications data, network traffic 252a, are sent by network terminals that are part of the first communications protocol domain 210a, are within the first communications protocol domain 210a, and are destined for network terminals that are part of the second communications protocol domain 210b. Network traffic 252c, is sent by network terminals that are part of the first communications protocol domain 210a, has started the procedure of translation from first communications protocol to the second communications protocol within the interworking node 225, and is destined for network terminals that are part of the second communications protocol domain 210b. Network traffic 252b, is sent by network terminals that are part of the first communications protocol domain 210a, has completed the procedure of translation from first communications protocol to the second communications protocol, is within the second communications protocol domain 210b, and is destined for network terminals that are part of the second communications protocol domain 210b.

Similarly, traffic from the second communications protocol domain 210b destined for the first communications protocol domain 210a is represented by network traffic 253a, b, c. The interworking link may contain network traffic 253a, b, c at different stages of protocol translation. Multiple packets of communications data, network traffic 253b, are sent by network terminals that are part of the second communications protocol domain 210b, are within the second communications protocol domain 210b, and are destined for network terminals that are part of the first communications protocol domain 210a. Network traffic 252c, is sent by network terminals that are part of the second communications protocol domain 210b, has started the procedure of translation from second communications protocol to the first communications protocol within the interworking node 225, and is destined for network terminals that are part of the first communications protocol domain 210a. Network traffic 253a, is sent by network terminals that are part of the second communications protocol domain 210b, has completed the procedure of translation from the second communications protocol to the first communications protocol, is within the first communications protocol domain 210a, and is destined for network terminals that are part of the first communications protocol domain 210a.

Another example embodiment may embed interworking channel state representations 255a, b, 256a, b, 257a, b, and 258a, b within network traffic 252a, b, c, and 253a, b, c. In this example embodiment, the network traffic 252c and 253c containing interworking channel state representations are automatically monitored and the interworking channel state representations are automatically translated to facilitate transparent awareness between the communications protocols of the adjacent (vertical or horizontal) maintenance domains.

Figure 3:
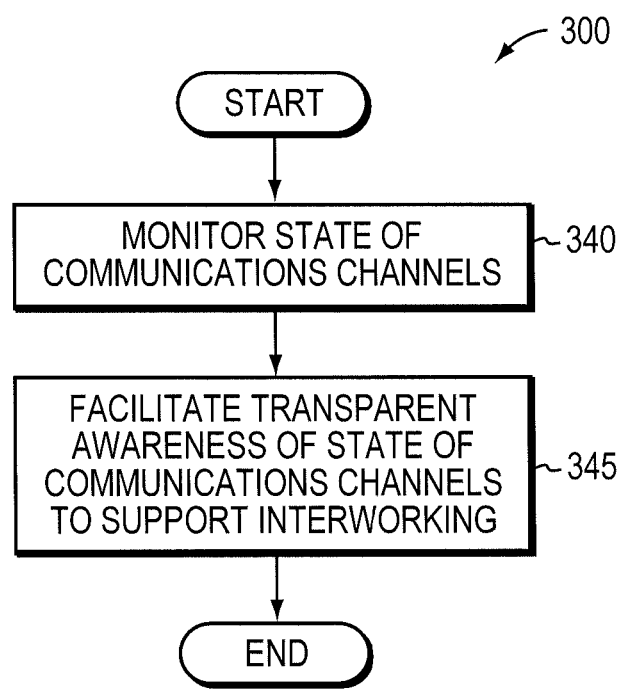
FIG. 3 is a flow diagram of an example procedure performed by an interworking node.

FIG. 3 shows a flow diagram 300 illustrating a method by which a state of communications channels are monitored 340 and transparent awareness of the state is facilitated 345 to support interworking between first and second communications protocol, the method may be used by an interworking node, such as the interworking node 225 of FIG. 2. A state of communications channels process 340 may monitor channel state information while not monitoring non-state information traffic. A transparent awareness facilitation process 345 provides the monitored channel state information to the interworking circuit and the communications network, as appropriate, to support interworking.

Figure 4:
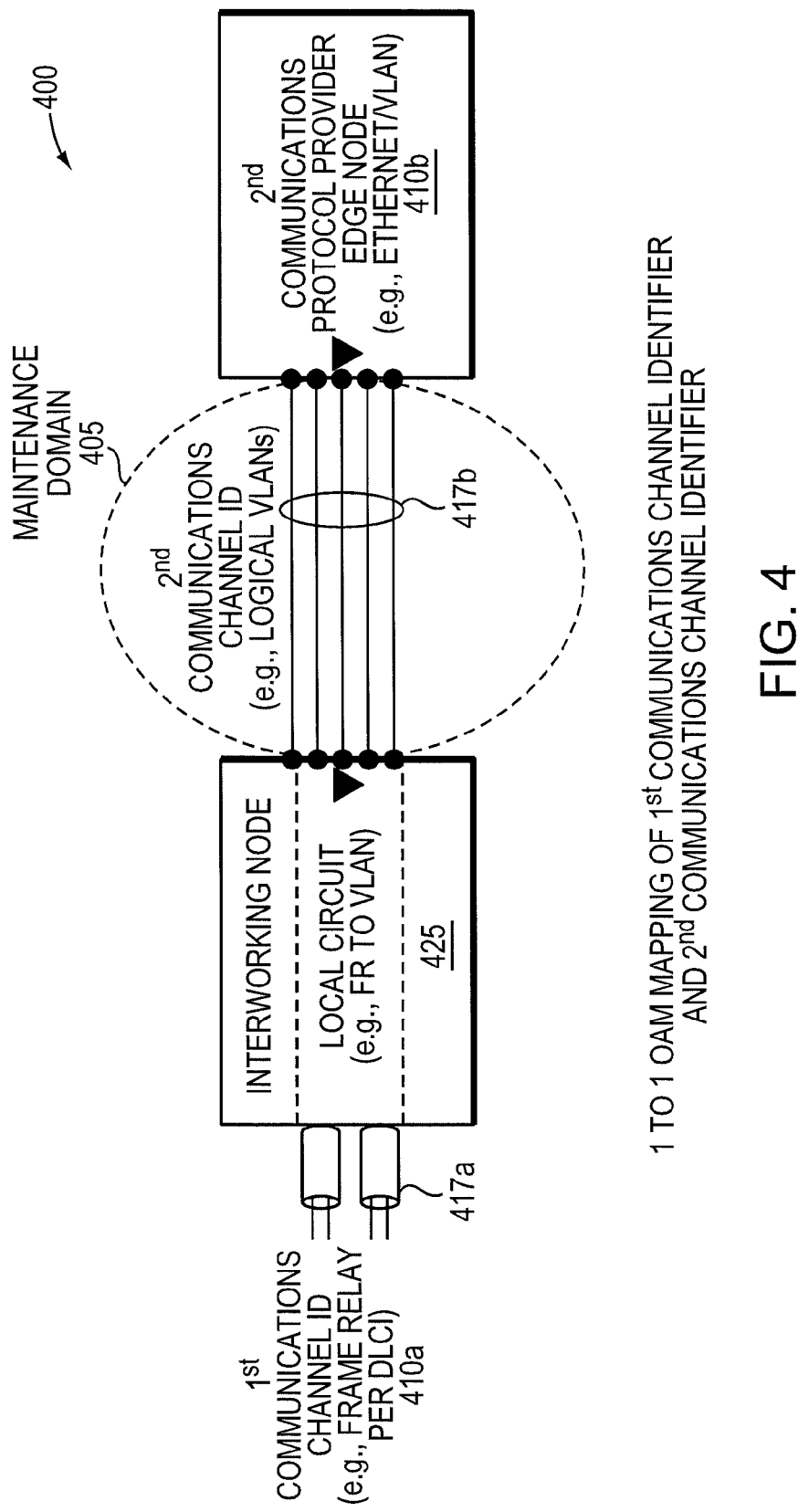
FIG. 4 is a block diagram illustrating a one-to-one mapping of a first communications channel identifier in a first communications protocol to a second communications channel identifier in a second communications protocol.

FIG. 4 shows an interworking circuit 400 of a communications network defining a first communications protocol domain 410a and a second communications protocol domain 410b, where one or more first communications channels 417a may be mapped to a corresponding one or more second communications channels 417b. The first and second communications channels are respectively associated with the first and second communications protocols. A section of the second communications protocol domain is shown as a maintenance domain 405. An interworking node 425 is situated between the first communications channels 417a and the second communications channels 417b. The interworking node 425 can perform a method, such as that described in reference to FIG. 3, by which a state of the first communications channels 417a and the second communications channels 417b are monitored and transparent awareness of the state is facilitated to support interworking of the interworking circuit 400.

The transparent awareness of the state of the communications channels can be facilitated by assigning identifiers, logical or physical, to each of the first communications channels 417a and to each of the second communications channels 417b, and mapping each first communications channel 417a identifier to a corresponding second communications channel 417b identifier, optionally on a one-to-one basis. The mapping of each second communications channel 417b identifier to a corresponding first communications channel 417a identifier, on a one-to-one basis, for example, may be used in an alternative embodiment. Other example embodiments of the present invention can use bases other than a one-to-one basis for mapping first communications channel identifiers 417a to second communications channel identifiers 417b, such as a one-to-one bases or many-to-one basis.

Another example embodiment of the present invention can include a first communications protocol of Frame Relay 410a and a second communications protocol of Ethernet. The example embodiment may also include multiple frame relay circuits 417a. In this example embodiment the multiple frame relay circuits 417a represent multiple physical DS3 speed circuits which terminate on the interworking node 425. The multiple frame relay circuits 417a may use one of the Frame Relay communications protocol local management interface (LMI) signaling methods to indicate the state of the individual circuits, with each virtual circuit identified by Frame Relay Data Link Connection Identifier(s) (DLCI).

The interwork node 425 converts the frame relay data stream to Ethernet frames for transmission to an attached Ethernet device 410b in communication therewith. The interworking node 425 may communicatively connect to a core network through an Ethernet link 417b. The interworking node 425 may use an OAM protocol set, such as IEEE 802.1ag, to indicate state, in which case 802.1ag continuity check messages (CCM) are passed between the interworking node and the Ethernet device 410b. Correct mapping of the DLCI, which identify Frame Relay communications channels, to corresponding Virtual Local Area Network (VLAN) channels, which identify Ethernet communications channels, in a one DLCI to one VLAN manner, ensure that signals are passed to the appropriate end points.

Figure 5:
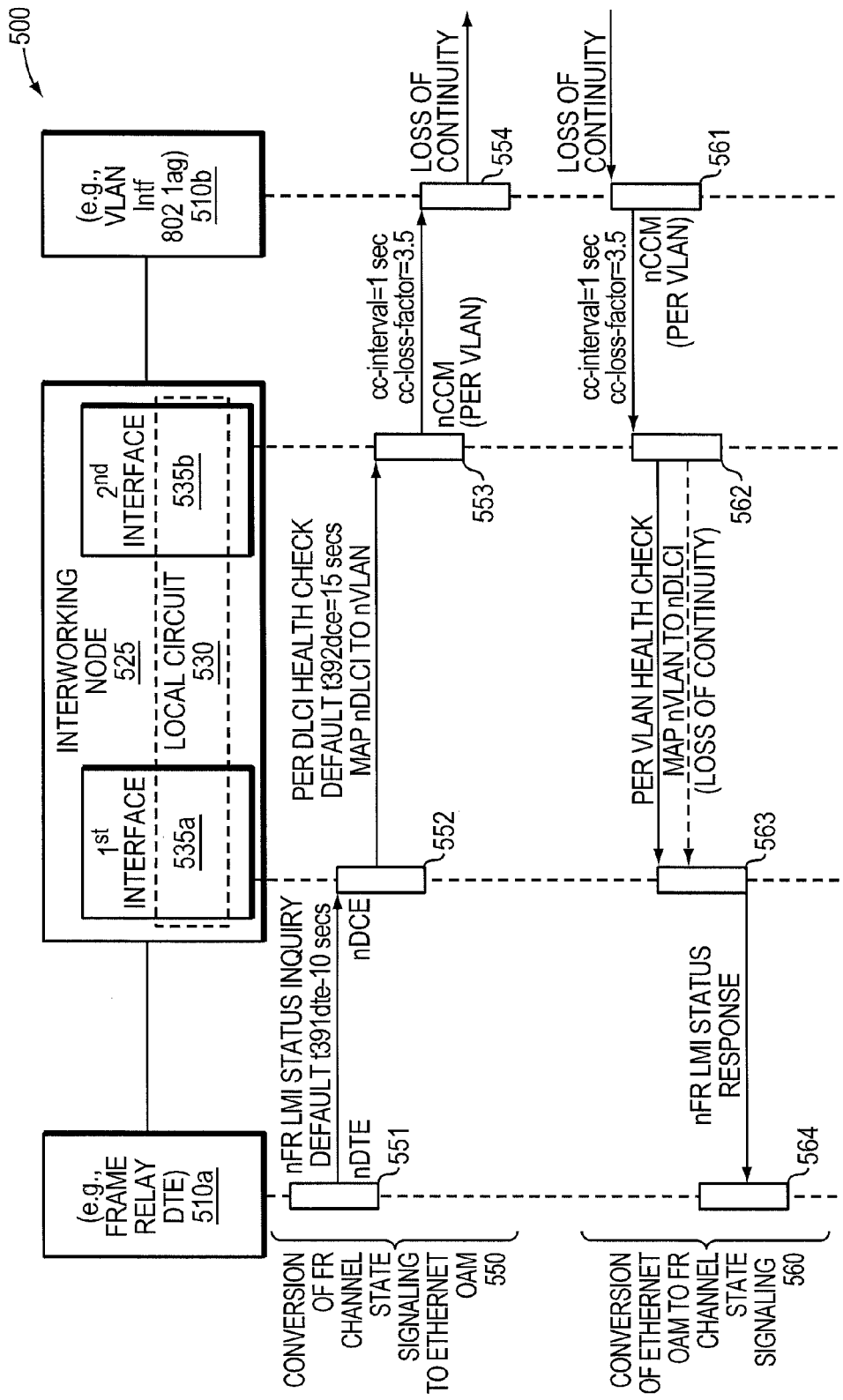
FIG. 5 is a signal and timing diagram illustrating a procedure performed at an interworking node in a case of a synchronous one-to-one mapping of a first communications channel identifier in a first communications protocol to a second communications channel identifier in a second communications protocol.

FIG. 5 is a signal timing diagram illustrating a process 500 for carrying out a method of supporting interworking between a first and a second communications protocol of an interworking circuit of a communications network. The interworking node 525, using a local circuit 530, which, in one example embodiment, can be logical, physical, or some combination thereof, interfaces with first communications channels associated with the first communications protocol, logical, physical or some combination thereof, using a first interface 353a. The interworking node 525 also interfaces with second communications channels associated with the second communications protocol, likewise logical, physical, or some combination thereof, using a second interface 353b.

The interworking node 525, to monitor a state of the first communications channels and facilitate transparent awareness of the state to the second communications channels, uses a signal and timing process 550. The signal and timing process 550 includes operations for receiving a first communications protocol status signal using the first protocol interface 535a, automatically translating the received first communications protocol status signal and channel identifier to a corresponding second communications protocol status signal and channel identifier, and transmitting the translated status signal and channel identifier using the second interface 353b.

The interworking node 525 uses another signal and timing procedure 560 to monitor a state of the second communications channels and facilitate transparent awareness of the state to the first communications channels. The signal and timing procedure 560 includes operations for receiving a second communications protocol status signal using the second protocol interface 535b, automatically translating the received second communications protocol status signal and channel identifier to a corresponding first communications protocol status signal and channel identifier, and transmitting the translated status signal and channel identifier using the first interface 353a.

In an example embodiment of the present invention, the signal and timing procedures 550, 560 can be reciprocal procedures, but need not be. In another example embodiment of the present invention, the signal and timing procedures 550, 560 can be synchronous, but need not be.

In another example embodiment of the present invention, FIG. 5 shows a view of the Frame Relay LMI to 802.1ag Ethernet OAM interworking. More details on specific message types that are passed, as well as the message path between devices and a proposal for timer intervals, are shown. The central two columns 552, 553 and 562, 563 show actions taking place within the Interworking node, while external columns 551, 554, 561 and 564 show the message path outside of the interworking node 545. The columns 551, 554, 561 and 564 are self-evident to a person of ordinary skill in the art.

Figure 6:
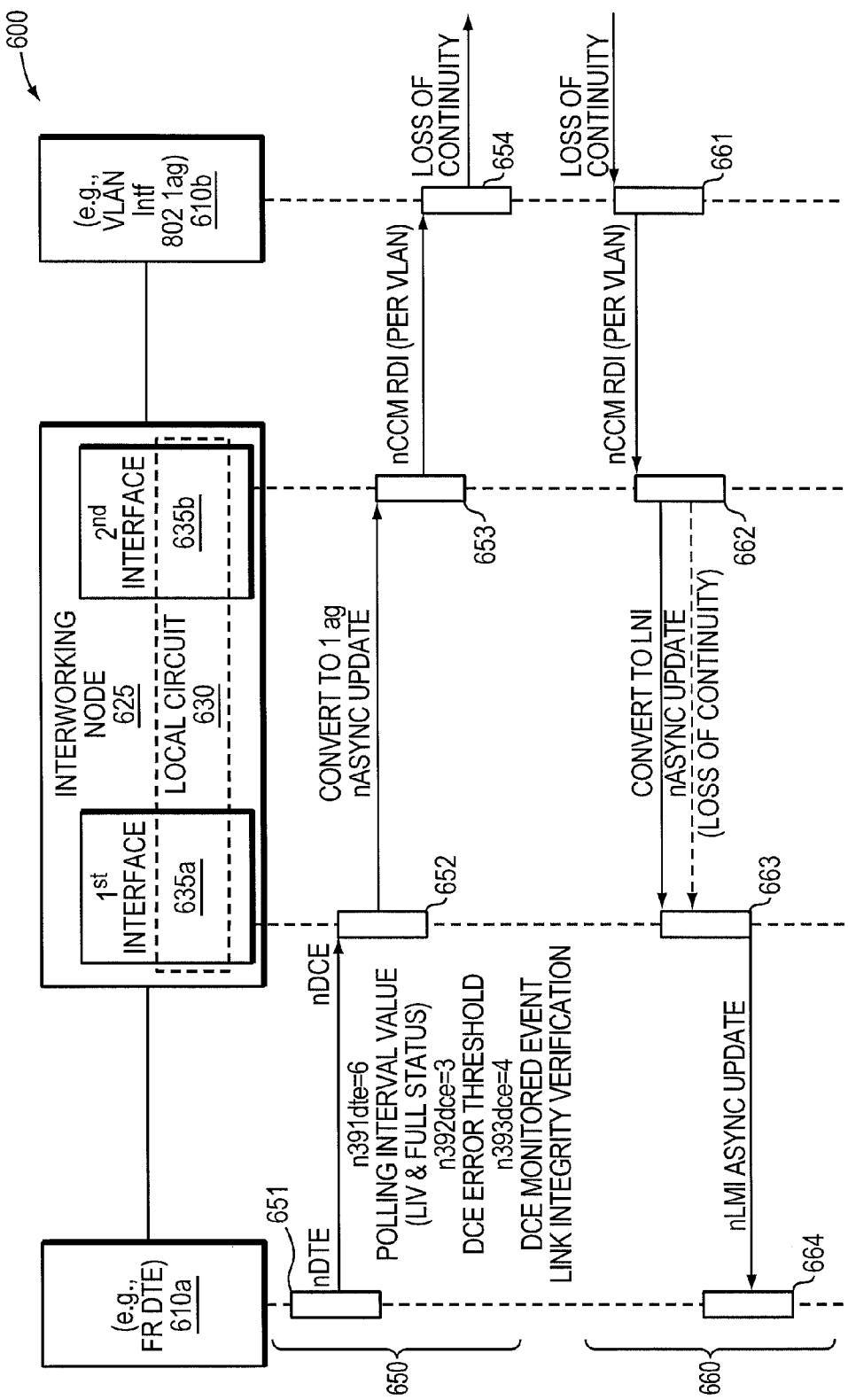
FIG. 6 is a signal and timing diagram illustrating a procedure performed at a interworking node in a case of an asynchronous one-to-one mapping of a first communications channel identifier in a first communications protocol to a second communications channel identifier in a second communications protocol.

FIG. 6 is a signal timing diagram illustrating a procedure 600 for carrying out a method of supporting interworking between a first and a second communications protocol of an interworking circuit of a communications network. The procedure 600 illustrated is yet another example embodiment of the present invention, the example is an interworking of Frame Relay LMI to 802.1ag Ethernet OAM. More details on specific message types that are passed, as well as the message path between devices and a proposal for timer intervals, are shown. The central two columns 652, 652 and 662, 663 show actions taking place within an interworking node 625, while external columns 651, 654, 661 and 664 show the message path outside of the interworking node 625. The columns 651, 654, 661 and 664 are self-evident to a person of ordinary skill in the art.

Figure 7:
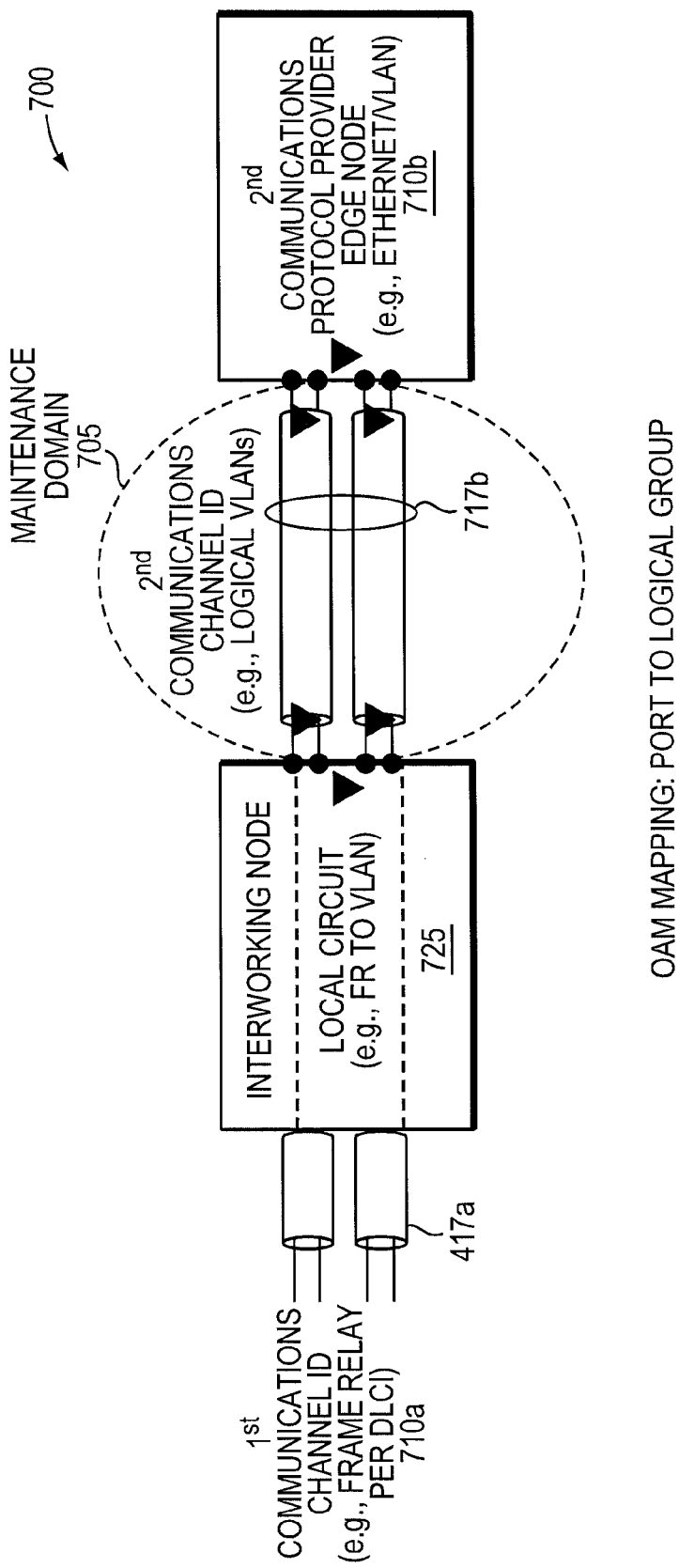
FIG. 7 is a block diagram illustrating the asynchronous frame relay port to Ethernet logical OAM group mapping of a first communications channel identifier in a first communications protocol to a second communications channel identifier in a second communications protocol.

FIG. 7 illustrates an example embodiment of the present invention, an interworking circuit 700 of a communications network defining a first communications protocol domain 710a and a second communications protocol domain 710b, where one or more first communications channels 717a are mapped to a corresponding one or more second communications channels 717b. The first and second communications channels are respectively associated with the first and second communications protocols. A section of the second communication protocol domain is shown as a maintenance domain 705. An interworking node 725 is situated between the first communications channels 717a and the second communications channels 717b. The interworking node 725 can perform a method, such as that described in FIG. 3, by which a state of the first communications channels 717a and the second communications channels 717b are monitored and transparent awareness of the state is facilitated to support interworking of the interworking circuit 700.

In an example embodiment of the present invention, the first communications protocol domain 710a can be Frame Relay, and the second communications protocol domain 710b can be Ethernet. In the example network of FIG. 7, Frame Relay DLCI 717a are mapped to individual Ethernet Q-in-Q or, alternately, IEEE 802.1ad circuits 717b. The interworking node 725 correlates, maps and transmits Frame Relay LMI and IEEE 802.1ag signals.

Figure 8:
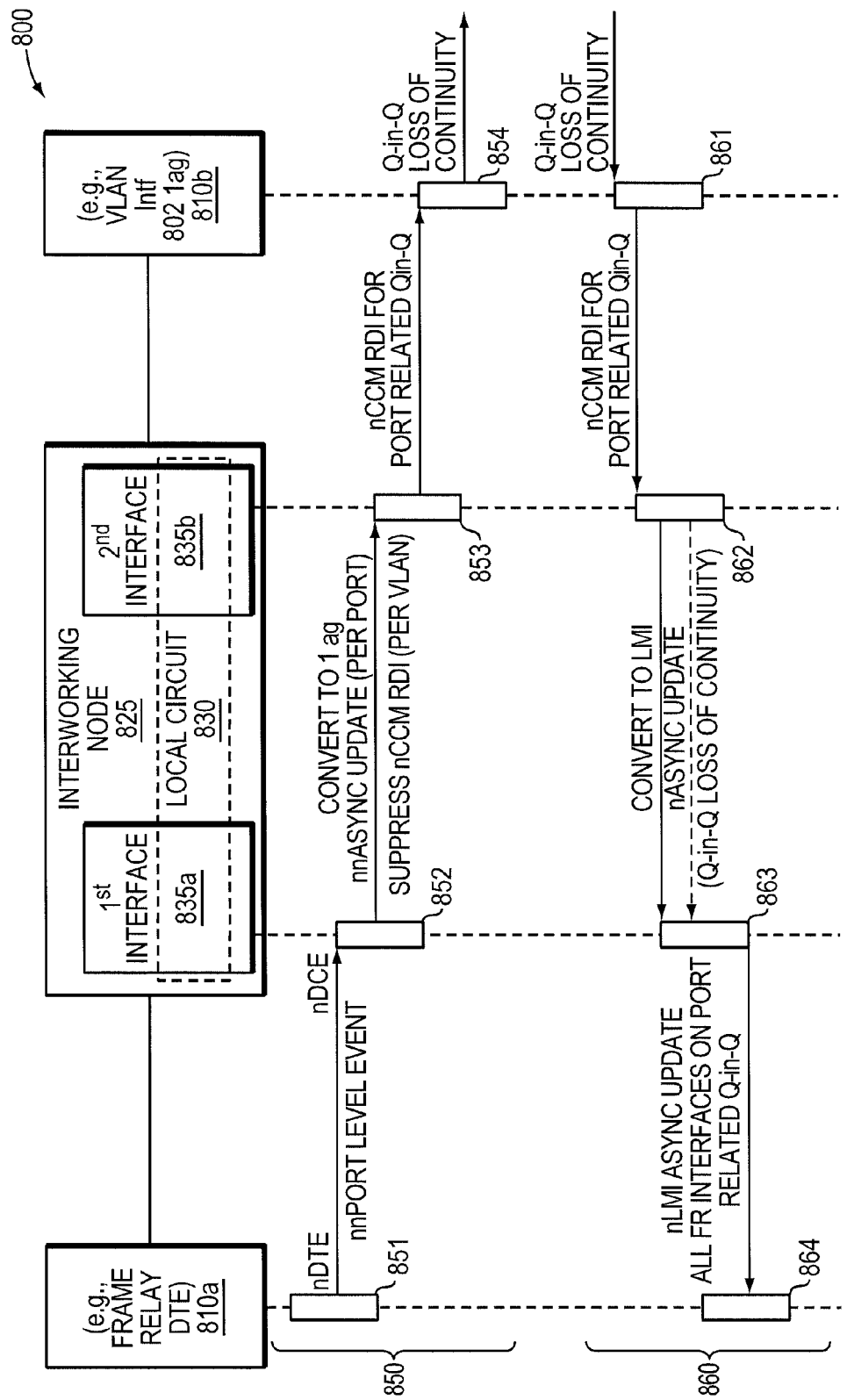
FIG. 8 is a signal and timing diagram illustrating a procedure performed at an interworking node in a case of an asynchronous frame relay port to Ethernet logical group mapping of a first communications channel identifier in a first communications protocol to a second communications channel identifier in a second communications protocol.

FIG. 8 is a signal timing diagram illustrating a procedure 800 for carrying out a method of supporting interworking between a first and a second communications protocol of an interworking circuit of a communications network. The procedure illustrated carries out yet another example embodiment of the present invention, for example, interworking of Frame Relay to Ethernet Q-in-Q or alternately IEEE 802.1ad. The central two columns 852, 853 and 862, 863 show actions taking place within an interworking node 825, while external columns 851, 854, 861, and 864 show the message path outside of the interworking node 825. The columns 851, 854, 861, and 864 are self-evident to a person of ordinary skill in the art. A benefit of the example embodiment of procedure 800 is the suppression of individual VLAN asynchronous updates.

Figure 9:
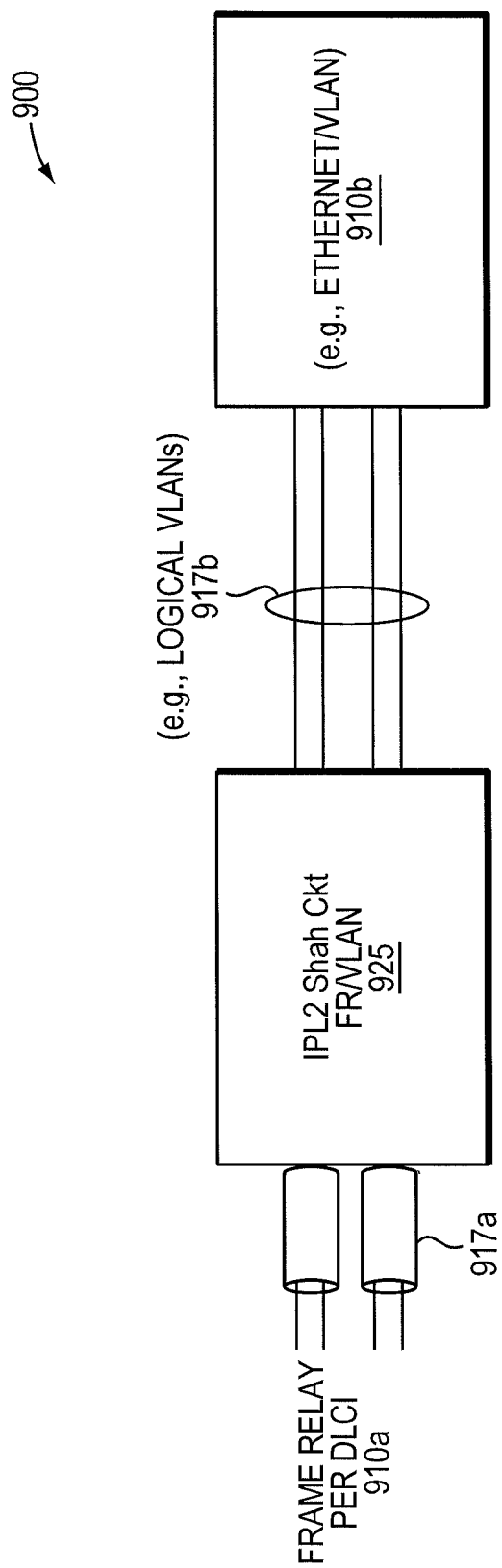
FIG. 9 is a block diagram illustrating a mapping of a first communications channel identifier in a first communications protocol to a second communications channel identifier in a second communications protocol.

FIG. 9 illustrates an example embodiment of the present invention, an interworking circuit 900 of a communications network comprised of a first communications protocol domain 910a and a second communications protocol domain 910b, where one or more first communications channels 917a are mapped to a corresponding one or more second communications channels 917b. The first and second communications channels are respectively associated with the first and second communications protocols. An interworking node 925 is situated between the first communications channels 917a and the second communications channels 917b. The interworking node 925 can perform a method, such as that described in FIG. 3, by which a state of the first communications channels 917a and the second communications channels 917b are monitored and transparent awareness of the state is facilitated to support interworking of the interworking circuit 900.

In an example embodiment of the present invention, the first communications protocol domain 910a can be Frame Relay, and the second communications protocol domain 910b can be Ethernet. Frame Relay DLCI 917a are mapped to individual Ethernet circuits 717b, which can be logical or physical. The interworking node 925 correlates, maps, and transmits Frame Relay LMI and Ethernet-Local Management Interface (E-LMI) signals.

Figure 10:
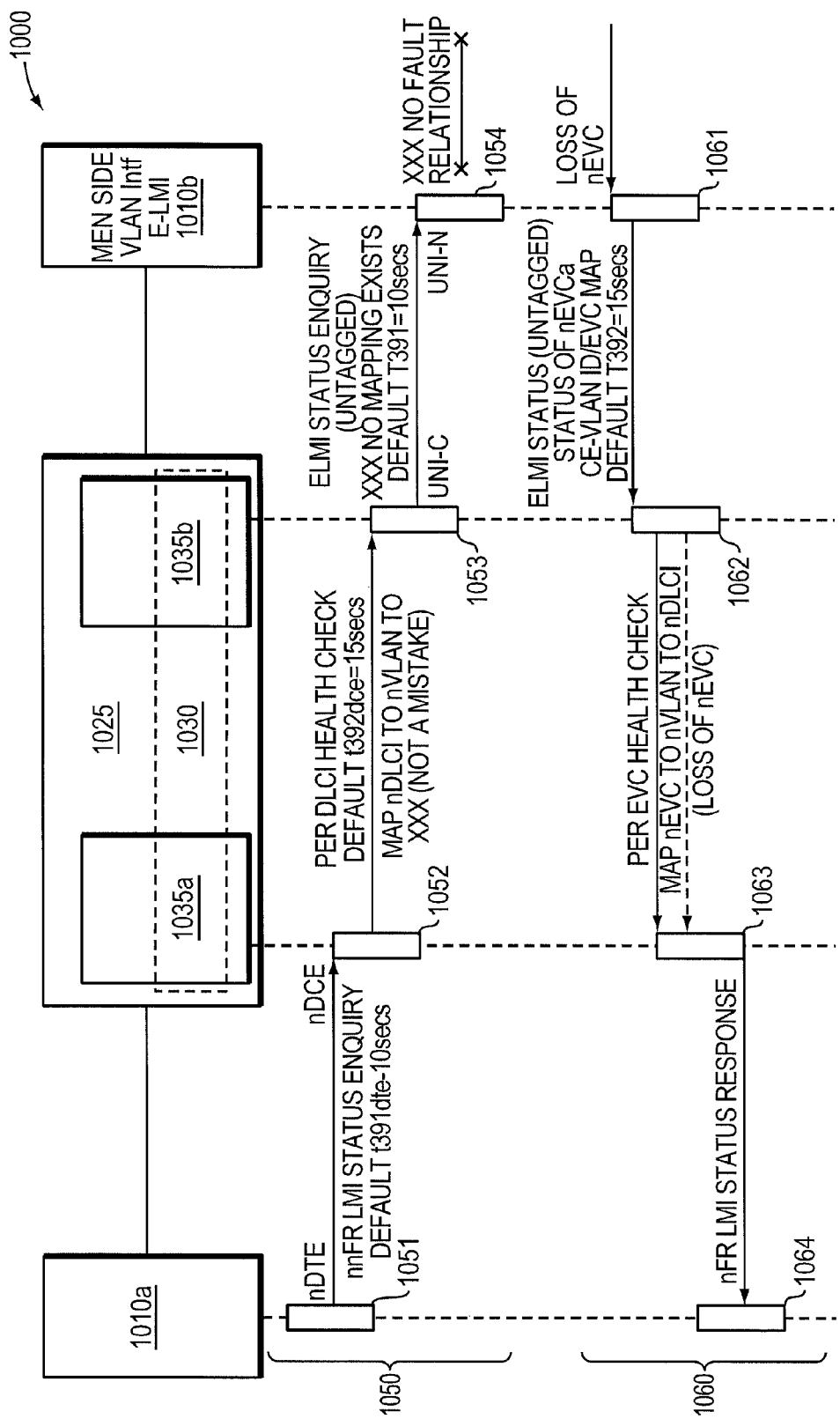
FIG. 10 is a signal and timing diagram illustrating the procedure performed at an interworking node in a case of a synchronous one-to-one mapping of a first communications channel identifier in a first communications protocol to a second communications channel identifier in a second communications protocol.

FIG. 10 is a signal timing diagram illustrating a procedure 1000 for carrying out a method of supporting interworking between a first and a second communications protocol of an interworking circuit of a communications network. The procedure illustrated carries out an example embodiment of the present invention, the example embodiment facilitating transparent awareness using FR LMI and E-LMI in a synchronous manner. The central two columns 1052, 1053, and 1062, 1063 show actions taking place within the Interworking node 1025, while external columns 1051, 1054, 1061, and 1064 show the message path outside of the Interworking Node 1025. The columns 1051, 1054, 1061, and 1064 are self-evident to a person of ordinary skill in the art.

Figure 11:
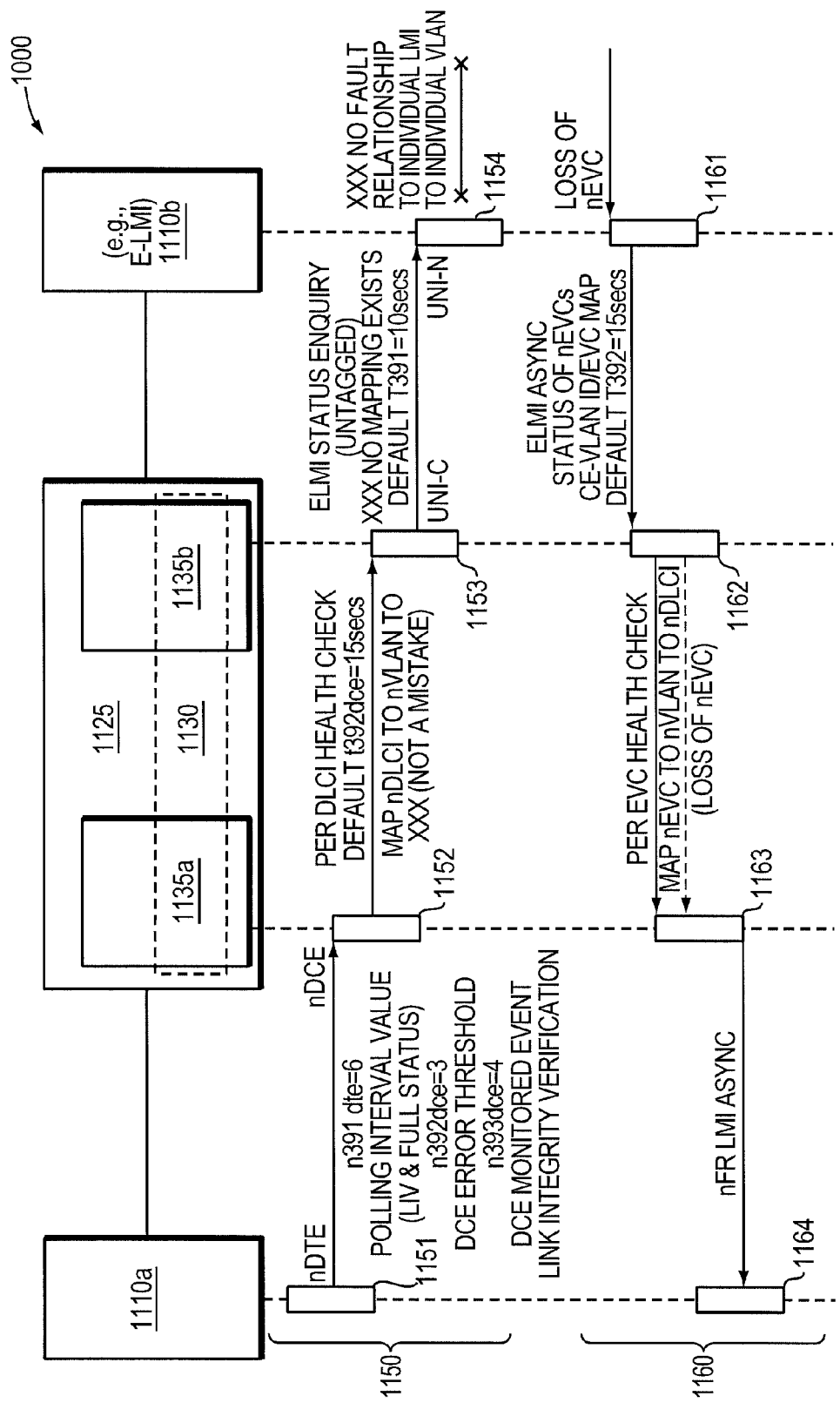
FIG. 11 is a signal and timing diagram illustrating the procedure performed at an interworking node in a case of an asynchronous one-to-one mapping of a first communications channel identifier in a first communications protocol to a second communications channel identifier in a second communications protocol.

FIG. 11 is a signal timing diagram illustrating a procedure 1100 for carrying out a method of supporting interworking between a first and a second communications protocol of an interworking circuit of a communications network. The procedure illustrated carries out an example embodiment of the present invention, the example embodiment facilitating transparent awareness using FR LMI and E-LMI in an asynchronous manner. The central two columns 1152, 1153, 1162, 1063 show actions taking place within the Interworking node 1025, while external columns 1151, 1154, 1161, and 1164 show the message path outside of the Interworking Node 1125. The columns 1151, 1154, 1161, and 1164 are self-evident to a person of ordinary skill in the art.

Figure 12:
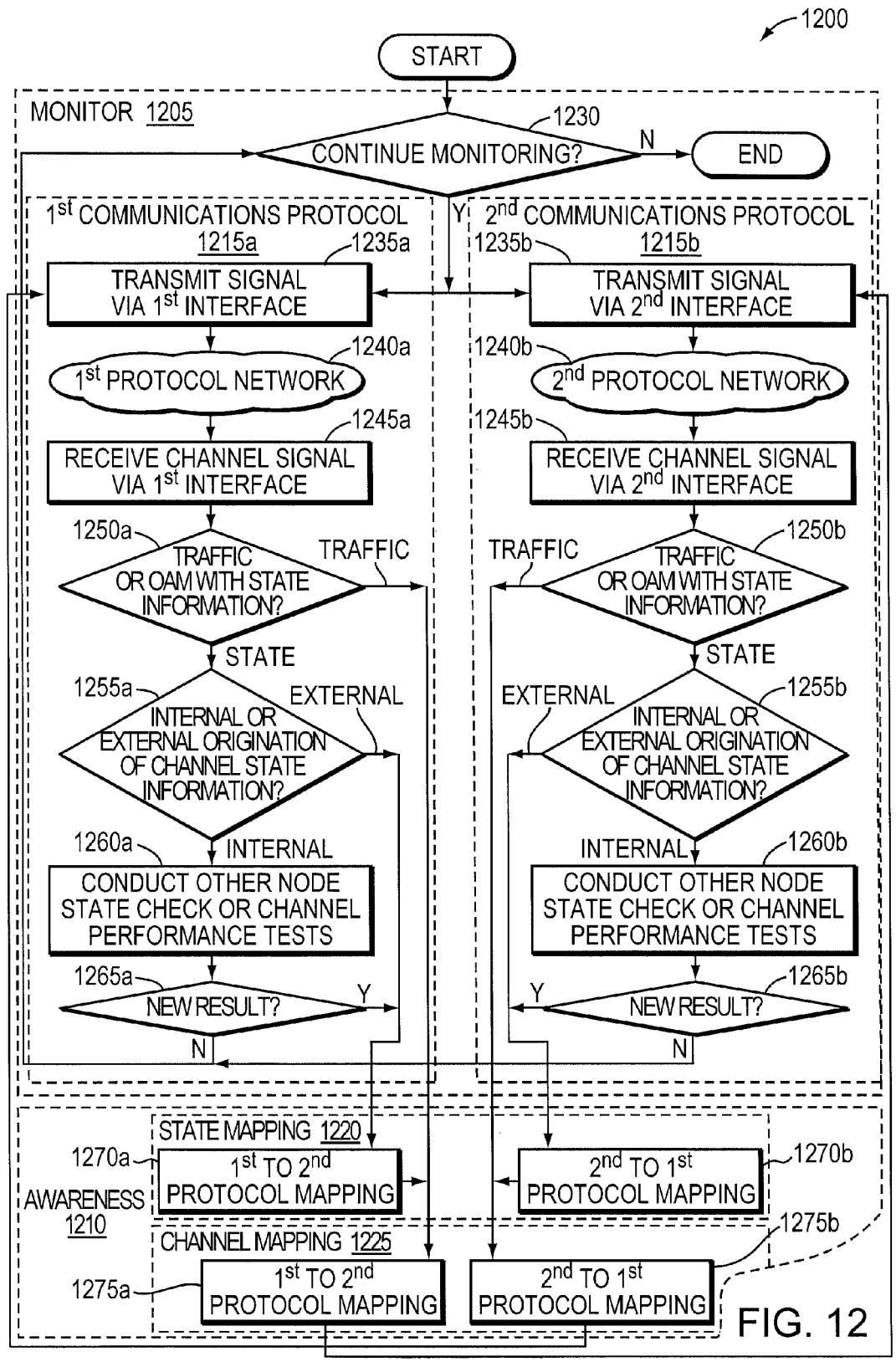
FIG. 12 is a flow diagram of an example procedure performed by an interworking node.

FIG. 12 is a flow diagram that illustrates a procedure performed by an interworking node 1200. The example interworking node 1200 may include a monitoring module 1205 and an awareness module 1210. The monitoring module 1205 may include a first communications protocol procedure (submodule) 1215a and a second communications protocol procedure 1215b. The awareness module 1210 may include two procedures (submodules): a state mapping procedure 1220 and a channel mapping procedure 1225.

In one example embodiment, the monitoring module 1205 monitors a state of communications channels. The interworking node 1200 flow diagram begins with determining whether to monitor, or to continue to monitor, the state of communications channels 1230. A determination to not monitor, or to not continue to monitor, the state of communications channels 1230 ends the interworking node 1200 procedure. A determination to monitor, or to continue to monitor, the state of communications channels 1230, in an example embodiment, may result in parallel monitoring procedures for the first and second communications protocols, while other example embodiments may perform the motoring procedures in series (i.e., one after the other) or some combination of performing monitoring procedures in parallel and series.

For the sake of descriptive clarity, the example embodiment discussion is limited to the first communications protocol procedure 1215a, but it should be understood that it applies to the first and second communications protocol procedures 1215a, b. The interworking node 1200 originates a channel state inquiry message, such as the state channel representation 257a in FIG. 2, and transmits the channel state inquiry message from the interworking node 1200 at the first interface 1235a to the first communications protocol network domain 1240a. The interworking node 1200 receives a channel state response message, such as the state channel representation 255a in FIG. 2, via the first interface 1245a.

In the example embodiment, a determination is made as to whether this received signal is a channel state response message 1250a. If the received signal is not a channel state response message, it is passed directly to the awareness module 1210. At the awareness module, the channel mapping procedure 1225 occurs, where messages are mapped or otherwise directed from the first protocol to the second protocol 1275a. On the other hand, if the received signal is a channel state response message, another determination is made.

In FR LMI and Ethernet 802.1ag protocols, remote FR and Ethernet devices proactively send updates (i.e., LMI and CCM messages), and it is by the process of not receiving these messages over several intervals that the interworking node realizes that the circuits are down and issues some sort of fault notification. Other networks may employ state inquiry messaging, such as in an example embodiment that determines whether the channel state response message is in response to the interworking node's 1200 originated channel state inquiry message or not 1255a. In this latter embodiment, if the received signal is not a channel state response message to the interworking node's 1200 originated channel state inquiry message, it is passed directly to the awareness module 1210. At the awareness module, the channel state mapping procedure 1220 occurs, where state messages are mapped from the first protocol to the second protocol 1270a. On the other hand, if the received signal is a channel state response message to the interworking node's 1200 originated channel state inquiry message, a procedure of channel state checks or channel performance test 1250a occur. A similar determination can be made in the former embodiment in which remote FR and Ethernet devices proactively send updates or internal interworking node state inquiries are automatically provided.

The final operation of the procedure in this example embodiment is a determination of whether the results of the procedure of channel state checks or channel performance test(s) 1250a are new or useful to communicate to the second communications protocol channel 1240b. If the result of the procedure of channel state checks or channel performance test(s) 1250a is not new or useful to communicate, the monitoring procedure starts anew with the determination of whether to monitor, or to continue to monitor, the state of communications channels 1230. If the result of the procedure of channel state checks or channel performance test 1250a is new or useful to communicate, then it is passed directly to the awareness module 1210. At the awareness, module the channel state mapping procedure 1220 occurs where state messages are mapped or otherwise directed from the first protocol to the second protocol 1270a.

In the awareness module 1210, all results for the channel state mapping procedure 1220 are input to the channel mapping procedure 1225. The result of the procedure of mapping channel state of the first communications protocol to channel states of the second communications protocol 1270a is a possible input for the procedure of mapping channel identification of the first communications protocol to channel identification of the second communications protocol 1275a, where channel identification can be logical or physical. The result of the procedure of mapping channel identification of the first communications protocol to channel identification of the second communications protocol 1275a is an input for transmitting a message to the second protocol domain of the communications network procedure 1235b.

In this example embodiment, the second communications protocol division 1215b of the interworking node 1200 uses an identical procedure 1215b to the procedure 1215a just described in the above few paragraphs to monitor the state of communications channels of the second communications protocol.

Figure 13:
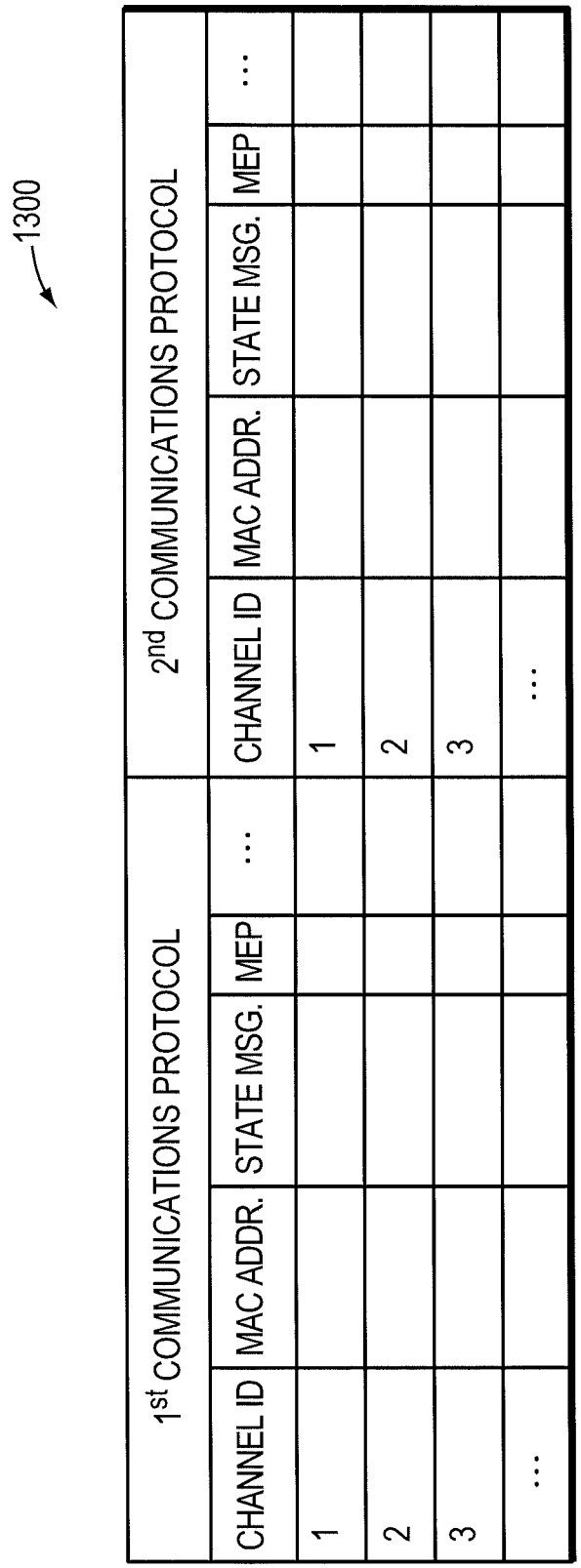
FIG. 13 is a block diagram illustrating contents of a table that may be used in the method, or corresponding apparatus, for facilitating transparent state awareness of monitored channels of an interworking circuit in a communications network.

FIG. 13 is a block diagram illustrating contents of a table 1300 optionally accessed during a mapping procedure, where the mapping procedure maps first and second channel and state associated with the channels, to a corresponding second and first channels and associated states, respectively, to facilitate transparent awareness of an interworking circuit of a communications network, the first and second channels being associated with first and second communications protocols.

It should be understood that the flow diagrams of FIGS. 3, and 12 and the signal flow and timing diagrams of FIGS. 5, 6, 8, 10, and 11 are examples that can include more or fewer components, be partitioned into subunits, or be implemented in different combinations. Moreover, the flow diagrams may be implemented in hardware, firmware, or software. If implemented in software, the software may be written in any software language suitable for use in networks as illustrated in FIGS. 1A, 1B, 4, 7, and 9. The software may be embodied on any form of computer readable medium, such as RAM, ROM, or magnetic or optical disk, and loaded and executed by generic or custom processor(s).

The invention is applicable to any communications network protocol as long as two or more communications protocols, such as Frame Relay (FR) and Ethernet, are used.

While this invention has been particularly shown and described with references to example embodiments thereof, it will be understood by those skilled in the art that various changes in form and details may be made therein without departing from the scope of the invention encompassed by the appended claims.

What is claimed is:

1. A method for supporting interworking between a first and a second communications protocols, the method comprising:
    monitoring channel state representations at first and second interfaces of an interworking circuit, operating at a common communications layer of a communications network, the first and second interfaces associated with the first and second communications protocols, respectively; and
    facilitating transparent awareness of the channel state representations to support interworking between the first and second communications protocols, the facilitating transparent awareness including:
        accessing a table having stored therein identifiers of the first and second channels and translation information corresponding to states for each protocol;
        automatically translating a channel state representation in the first communications protocol to a corresponding channel state representation in the second communications protocol; and
        automatically translating a channel state representation in the second communications protocol to a corresponding channel state representation in the first communications protocol.

2. The method of claim 1 wherein the first communications protocol is Frame Relay and the second is Ethernet, and wherein the first interface is a Frame Relay interface and the second interface is an Ethernet interface, the first and second interfaces defining multiple logical subinterfaces corresponding to multiple channels.

3. The method of claim 2 wherein facilitating transparent awareness further includes:
    automatically translating a Frame Relay subinterface datalink connection identifier (DLCI) and local management connectivity messaging to a corresponding Ethernet subinterface virtual local area network identifier (VLANID) and connectivity messaging; and
    automatically translating the Ethernet subinterface VLANID and connectivity messaging to the corresponding Frame Relay subinterface DLCI and local management connectivity messaging.

4. The method of claim 1 wherein facilitating transparent awareness of the channel state representations further includes:
    mapping the channel state representation in the first communications protocol to the corresponding channel state representation in the second communications protocol.

5. The method of claim 1 wherein accessing the table further includes accessing the table for control or state information used to enable the interworking or to monitor, test, or troubleshoot at least one of the first or second channels or the interworking circuit.

6. The method of claim 1 wherein monitoring the channel state representations further includes using an operation, administration, and management (OAM) procedure to: confirm operation of the interfaces or the interworking circuit; detect or isolate faults or failures of the interfaces or the interworking circuit; or notify the interfaces or the interworking circuit of the faults or failures of the interfaces or the interworking circuit.

7. The method of claim 6 wherein the OAM procedure used further includes at least one other procedure to: verify connectivity; detect faults; monitor performance; or observe alarms indications.

8. The method of claim 1 further comprising:
    monitoring quality of service attributes of the interworking circuit; and
    notifying the first and second interfaces of the quality of service attributes of communications at the second and first interfaces, respectively.

9. The method of claim 8 further comprising determining at least one of the following states of the communications channels: availability; change in status; frame delay; frame delay variation; sequence error; bad frames or frame loss.

10. A non-transitory computer-readable medium having stored thereon instructions that, when executed by a processor, causes the processor to:
monitor channel state representations at first and second interfaces of an interworking circuit operating, at a common communications layer of a communications network, the first and second interfaces associated with the first and second communications protocols, respectively; and
facilitate transparent awareness of the channel state representations to support interworking between the first and second interfaces using a first and a second communications protocols, respectively, the facilitating transparent awareness including:
access a table having stored therein identifiers of the first and second communications protocols and translation information for translating between the first and second communications protocols;
automatically translating a channel state representation in the first communications protocol to a corresponding channel state representation in the second communications protocol; and
automatically translating a channel state representation in the second communications protocol to a corresponding channel state representation in the first communications protocol.

* * * * *